United States Patent
Awoniyi-Oteri et al.

(10) Patent No.: US 11,818,750 B2
(45) Date of Patent: Nov. 14, 2023

(54) PRIORITIZATION OF UPLINK TRANSMISSIONS DURING MAKE-BEFORE-BREAK HANDOVER

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Hung Dinh Ly, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 17/062,412

(22) Filed: Oct. 2, 2020

(65) Prior Publication Data
US 2021/0105797 A1    Apr. 8, 2021

Related U.S. Application Data

(60) Provisional application No. 62/911,148, filed on Oct. 4, 2019.

(51) Int. Cl.
*H04W 72/566* (2023.01)
*H04W 36/18* (2009.01)
*H04W 72/1268* (2023.01)

(52) U.S. Cl.
CPC ......... *H04W 72/569* (2023.01); *H04W 36/18* (2013.01); *H04W 72/1268* (2013.01); *H04W 72/566* (2023.01)

(58) Field of Classification Search
CPC . H04W 72/12; H04W 72/1242; H04W 36/18; H04W 72/1247; H04W 72/1268; H04W 36/0005; H04W 36/0069; H04W 72/569; H04W 72/566; H04B 7/0408; H04B 7/06; H04B 7/0868; H04B 7/088; H04B 7/0885; H04B 7/0888

See application file for complete search history.

(56) References Cited

U.S. PATENT DOCUMENTS

| | | | |
|---|---|---|---|
| 2014/0029532 A1* | 1/2014 | Han | H04L 67/75 370/329 |
| 2014/0192740 A1* | 7/2014 | Ekpenyong | H04L 5/0094 370/329 |
| 2016/0261365 A1* | 9/2016 | Chen | H04W 72/085 |
| 2018/0234147 A1* | 8/2018 | Lee | H04W 72/0413 |
| 2019/0253945 A1* | 8/2019 | Paladugu | H04W 12/033 |
| 2019/0260456 A1 | 8/2019 | Zhou et al. | |
| 2020/0314773 A1* | 10/2020 | Hsieh | H04W 52/346 |

(Continued)

OTHER PUBLICATIONS

Antonioli et al., "Dual Connectivity for LTE-NR Cellular Networks: Challenges and Open Issues," Journal of Communication and Information Systems, vol. 33, No. 1, 2018, pp. 282-294 (Year: 2018).*

(Continued)

*Primary Examiner* — Un C Cho
*Assistant Examiner* — Lalita W Pace

(57) ABSTRACT

Certain aspects of the present disclosure provide techniques for prioritizing overlapping or near overlapping uplink transmissions for a source base station (BS) and a target BS during a make-before-break handover of a user equipment (UE) from the source BS to the target BS.

10 Claims, 11 Drawing Sheets

(56) References Cited

U.S. PATENT DOCUMENTS

2021/0045023 A1* 2/2021 Kim ..................... H04W 74/08
2021/0105673 A1* 4/2021 Jassal ................ H04W 36/0069

OTHER PUBLICATIONS

Intel Corporation, "Physical layer aspects of enhanced mobility," 3GPP TSG RAN WG1 Meeting #98bis, R1-19100679, Chongqing, China, Aug. 14-20, 2019, pp. 1-4 (Year: 2019).*

Intel Corporation, "Summary of offline discussion on physical layer aspects of NR mobility enhancement," 3GPP TSG RAN WG1 Meeting #98bis, R1-1911538, Chongqing, China, Aug. 14-20, 2019, pp. 1-12 (Year: 2019).*

Polese et al., "Improved Handover Through Dual Connectivity in 5G mmWave Mobile Networks," IEEE Journal on Selected Areas in Communications, vol. 35, No. 9, Sep. 2017, pp. 2069-2084 (Year: 2017).*

"3rd Generation Partnership Project; Technical Specification Group Services and System Aspects; Release 15 Description; Summary of Rel-15 Work Items (Release 15)", 3GPP Draft; 21915-F00, 3rd Generation Partnership Project (3GPP), Mobile Competence Centre, 650, Route Des Lucioles, F-06921, Sophia-Antipolis Cedex, France, Oct. 1, 2019 (Oct. 1, 2019), XP051799986, pp. 1-118, Retrieved from the Internet: URL: https://ftp.3gpp.org/3guInternal/3GPP_ultimate_versions_to_be_transposed/sentToDpc/21915-f00.zip 21915-f00.docx [retrieved on Oct. 1, 2019] p. 34, line 2-line 5.

International Search Report and Written Opinion—PCT/US2020/054171—ISA/EPO—Mar. 3, 2021.

MCC Support: "Draft Report of 3GPP TSG RAN WG1 #98 v0.2.0 (Prague, Czech Rep, Aug. 26-30, 2019)", 3GPP Draft, 3GPP TSG RAN WG1 Meeting #98bis, Draft_Minutes_Report_RAN1#98_V020, 3rd Generation Partnership Project (3GPP), Mobile Competence Centre, 650, Route Des Lucioles, F-06921, Sophia-Antipolis Cedex, France, vol. RAN WG1, No. Chongqing, China; 20191014-20191018, Sep. 11, 2019 (Sep. 11, 2019), XP051782882, 172 pages, Retrieved from the Internet:URL: http://www.3gpp.org/ftp/tsg_ran/WG1_RL1/TSGR1_98/Report/Draft_Minutes_report_RAN1%2398_v020.zip [retrieved on Sep. 11, 2019] p. 141, line 45-line 60 p. 140, line 20-line 25.

Qualcomm Incorporated: "Support Tx Sharing During MBB HO," 3GPP Draft, 3GPP TSG-RAN WG2 Meeting #107, R2-1908933, 3rd Generation Partnership Project (3GPP), Mobile Competence Centre, 650, Route Des Lucioles, F-06921, Sophia-Antipolis Cedex, France, vol. RAN WG2 No. Prague, CZ; 20190826-20190830, Aug. 15, 2019 (Aug. 15, 2019), XP051766751, 4 pages, Retrieved from the Internet: URL: http://www.3gpp.org/ftp/tsg_ran/WG2_RL2/TSGR2_107/Docs/R2-1908933.zip [retrieved on Aug. 15, 2019] paragraphs [002. L [02.2] ~ [003.] figure 1 ,p. 1, line 9-line 22, p. 2, line 10-line 15.

* cited by examiner

PRIORITIZATION OF UPLINK TRANSMISSIONS DURING MAKE-BEFORE-BREAK HANDOVER

CROSS-REFERENCE TO RELATED APPLICATION

This application claims benefit of and priority to U.S. Provisional Patent Application No. 62/911,148, filed Oct. 4, 2019, which is hereby incorporated by reference in its entirety.

BACKGROUND

Field of the Disclosure

Aspects of the present disclosure relate to wireless communications, and more particularly, to techniques for prioritizing overlapping or near overlapping uplink transmissions for a source base station (BS) and a target BS during a make-before-break (MBB) handover of a user equipment (UE) from the source BS to the target BS.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for prioritizing overlapping or near overlapping uplink transmissions for a source base station (BS) and a target BS during a make-before-break (MBB) handover of a user equipment (UE) from the source BS to the target BS.

Certain aspects of the present disclosure provide a method for wireless communication by a UE. The method generally includes detecting that the UE is simultaneously connected to a source BS of a source cell and a target BS of a target cell during a handover of the UE from the source cell to the target cell; detecting during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission; and transmitting one of the first or second uplink transmissions at the respective first or second transmission time, wherein a decision relating to transmitting which one of the first or second uplink transmissions is based on a priority associated with at least one of the first uplink transmission or the second uplink transmission.

Certain aspects of the present disclosure provide a method for wireless communication by a BS. The method generally includes detecting that a UE is simultaneously connected to a source BS of a source cell and a target BS of a target cell during a handover of the UE from the source cell to the target cell; detecting during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission; determining that the UE is to transmit one of the first or second uplink transmissions at the respective first or second transmission time, wherein a decision relating to the UE transmitting which one of the first or second uplink transmissions is based on a priority associated with at least one of the first uplink transmission or the second uplink transmission; and communicating with the UE based on the determination.

Certain aspects of the present disclosure provide an apparatus for wireless communication by a UE. The apparatus includes a memory and a processor coupled with the memory. The memory and the processor are configured to: detect that the UE is simultaneously connected to a source BS of a source cell and a target BS of a target cell during a handover of the UE from the source cell to the target cell; detect during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission; and transmit one of the first or second uplink transmissions at the respective first or second transmission time, wherein a decision relating to transmitting which one of the first or second uplink transmissions is based on a priority associated with at least one of the first uplink transmission or the second uplink transmission.

Certain aspects of the present disclosure provide an apparatus for wireless communication by a network entity. The apparatus includes a memory and a processor coupled with the memory. The memory and the processor are configured to: detect that a UE is simultaneously connected to a source BS of a source cell and a target BS of a target cell during a handover of the UE from the source cell to the target cell; detect during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission; determine that the UE is to transmit one of the first or second uplink transmissions at the respective first or second transmission time, wherein a decision relating to the UE transmitting which one of the first or second uplink transmissions is based on a priority associated with at least one of the first uplink transmission or the second uplink transmission; and communicate with the UE based on the determination.

Certain aspects of the present disclosure provide an apparatus for wireless communication by a UE. The apparatus may include means for detecting that the UE is simultaneously connected to a source BS of a source cell and a target BS of a target cell during a handover of the UE from the source cell to the target cell; means for detecting during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission; and means for transmitting one of the first or second uplink transmissions at the respective first or second transmission time, wherein a decision relating to transmitting which one of the first or second uplink transmissions is based on a priority associated with at least one of the first uplink transmission or the second uplink transmission.

Certain aspects of the present disclosure provide an apparatus for wireless communication by a network entity. The apparatus may include means for detecting that a UE is simultaneously connected to a source BS of a source cell and a target BS of a target cell during a handover of the UE from the source cell to the target cell; means for detecting during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission; means for determining that the UE is to transmit one of the first or second uplink transmissions at the respective first or second transmission time, wherein a decision relating to the UE transmitting which one of the first or second uplink transmissions is based on a priority associated with at least one of the first uplink transmission or the second uplink transmission; and means for communicating with the UE based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
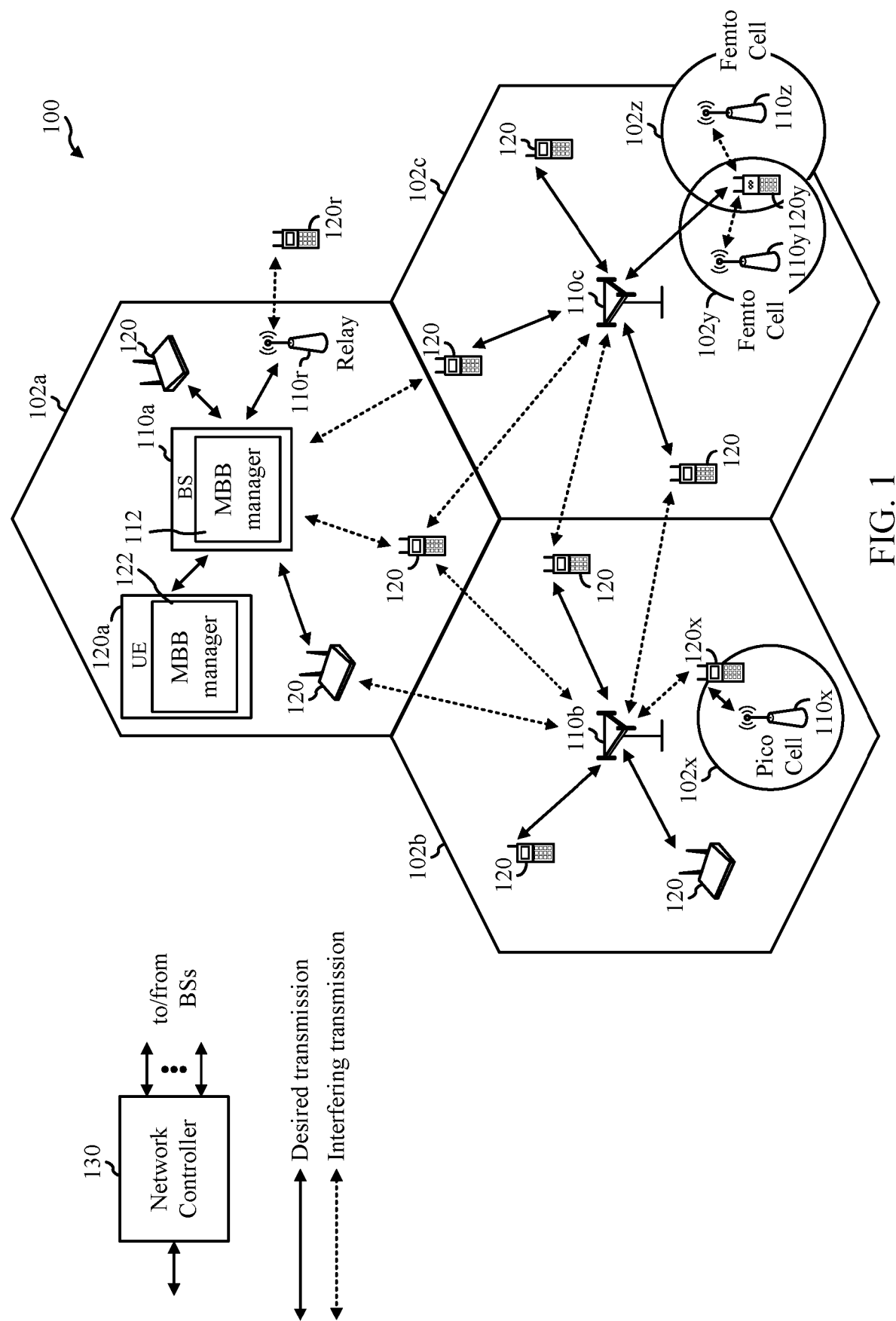
FIG. 1 is a block diagram conceptually illustrating an example telecommunications system, in accordance with certain aspects of the present disclosure.

In certain cases, source and target next generation nodeBs (gNBs) may not coordinate the assignment of resources (e.g., time and frequency resources) for communication with devices (e.g., user equipments (UEs)) in respective source and target cells. This lack of coordination between the source and target gNBs may lead to the source and target gNBs configuring overlapping uplink (UL) and/or downlink (DL) resources for communication with the same UE, for example, during a make-before-break (MBB) handover. For example, both the source and target gNBs may configure a same slot or portion of a same slot for UL and/or DL communication with the UE. In certain cases, different gNBs may use different beams for communication with devices in their respective cells. However, generally, a UE can communicate using only one beam at a time. Thus, during the MBB handover when the UE is expected to communicate simultaneously with both the source and target cells, if the slot assignments for the source and target cells overlap, the UE cannot simultaneously communicate with both cells using their respective beams.

In certain cases, even if the resource assignments of the source and target cells may not overlap, the time difference between the resource assignments of the cells may not be long enough so that the UE can switch beams. Generally, the UE requires a minimum amount of time to switch beams. Thus, if the time interval between resource assignments of a source cell and a target cell using different beams is less than the minimum required threshold time, the UE after communicating (e.g., UL or DL) using a first resource (e.g., a first slot) of a first cell (e.g., source or target cell) may not be able to switch beams in time to communicate using a second resource (e.g., a second slot) of a second cell (the other one of the source or target cell).

Aspects of the present disclosure provide techniques for selecting between uplink transmissions scheduled by source and target cells on at least partially overlapping resources or when the time interval between the resource assignments of the source and target cells is less than a minimum required threshold time, when a UE is expected to communicate simultaneously with the source and target cells during a MBB handover of the UE between the source and target cells.

The following description provides examples of prioritizing overlapping or near overlapping uplink transmissions for a source base station (BS) and a target BS during a MBB handover of a UE from the source BS to the target BS in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may include one or more UEs 120a (with a MBB manager 122) configured to perform operations 500 of FIG. 5 and/or one or more BSs 110a (with a MBB manager 112) configured to perform operations 600 of FIG. 6.

The wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

The wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
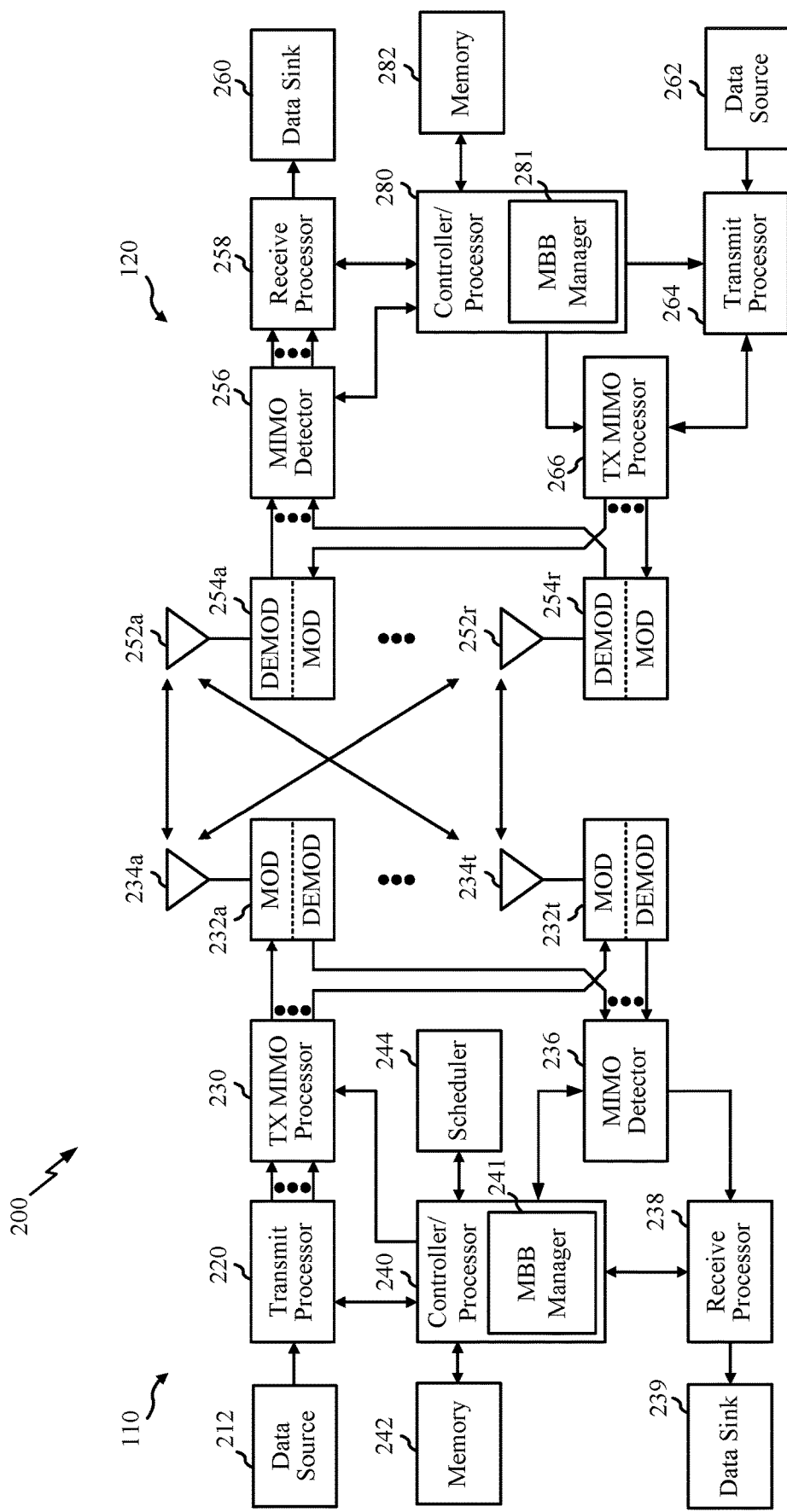
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110 has a MBB manager 241 that may be configured to perform the operations illustrated in FIG. 6, as well as other operations disclosed herein for prioritizing overlapping or near overlapping uplink transmissions for a source BS and a target BS during a MBB handover of a UE from the source BS to the target BS, in accordance with aspects of the present disclosure described herein.

Figure 5:
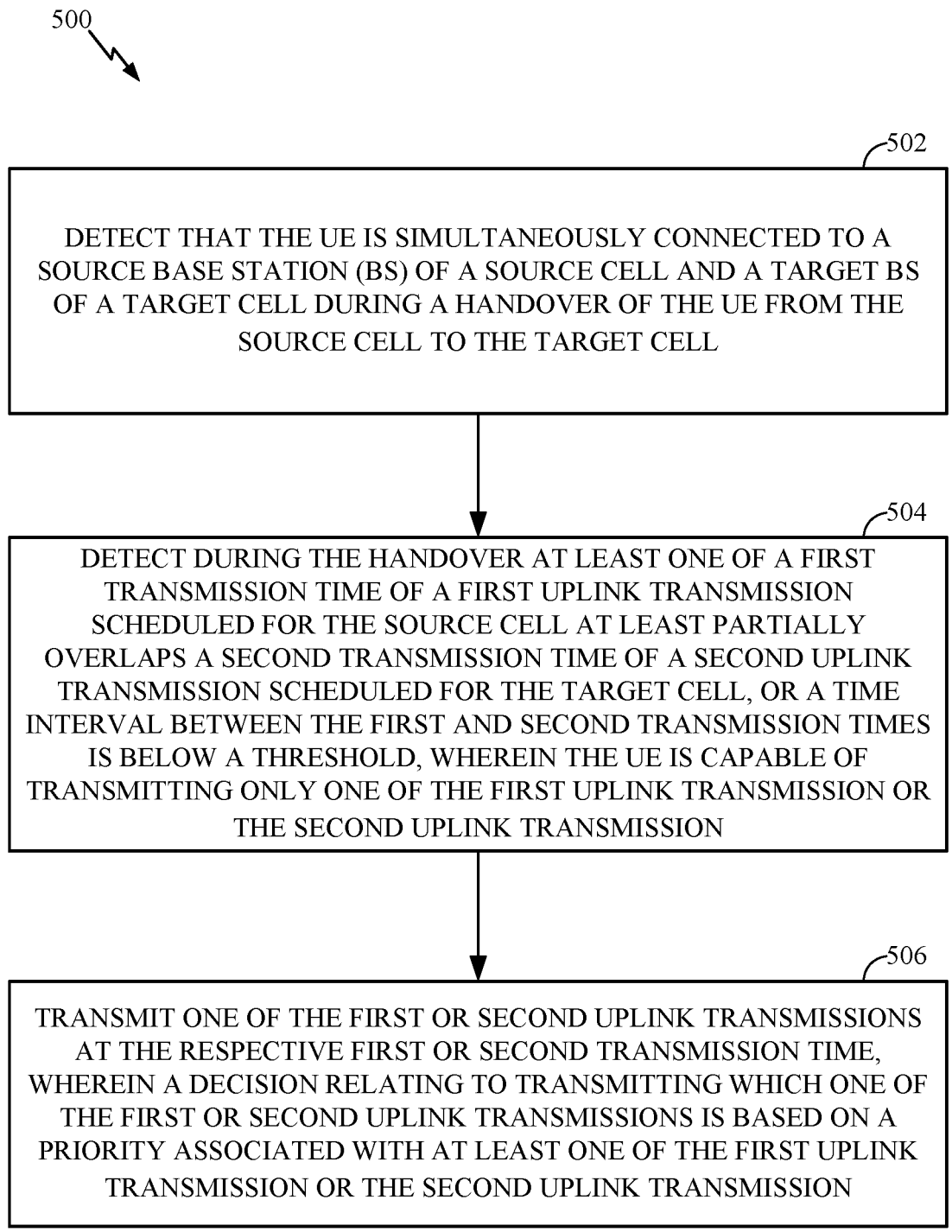
FIG. 5 illustrates example operations performed by a UE for selecting between overlapping uplink transmissions during a MBB handover of the UE between a source BS (e.g., source gNB) and a target BS (e.g., target gNB), in accordance with certain aspects of the present disclosure.

As shown in FIG. 2, the controller/processor 280 of the UE 120 has a MBB manager 281 that may be configured to perform the operations illustrated in FIG. 5, as well as other operations disclosed herein for prioritizing overlapping or near overlapping uplink transmissions for a source BS and a target BS during a MBB handover of a UE from the source BS to the target BS, in accordance with aspects of the present disclosure described herein.

Although shown at the controller/processor, other components of the UE 120a and the BS 110a may be used performing the operations described herein.

In alternative aspects, the MBB manager 241 of the BS 110 may be configured for transmitting a handover command for a MBB handover of a UE from the source BS to a target BS; transmitting information relating to a new configuration to be used by the source BS and the UE during the MBB handover; receiving an indication from the UE that the new configuration has been activated by the UE; and in response to receiving the indication, activating the new configuration for use during the MBB handover, in accordance with aspects of the present disclosure described herein. Further, the MBB manager 281 of the UE 120 may be configured for receiving a handover command for a MBB handover of the UE from a source BS to a target BS; receiving information relating to a new configuration to be used by the UE and the source BS during the MBB handover; activating the new configuration for use during the MBB handover; and transmitting an indication to the source base BS that the new configuration has been activated by the UE, the indication causing the source BS to activate the new configuration synchronously with the activating by the UE, in accordance with aspects of the present disclosure described herein.

Example Make-Before-Break (MBB) Handover

One of the major goals of mobility enhancement is to achieve a 0ms interruption in service during handover of a user equipment (UE) from a source base station (BS) to a target BS. Some proposals being considered by 3rd Generation Partnership Project (3GPP) for new radio (NR) include make-before-break (MBB) type of handover, which is a Rel. 14 LTE feature and includes a UE maintaining a source link to a source BS while establishing a target link to a target BS, in order to shorten or completely eliminate interruption in service to the UE. During the MBB handover from the source BS (e.g., serving a source cell) to the target BS (e.g., serving a target cell), the UE is expected to maintain connectivity with both the source BS and the target BS till the UE has successfully camped on to the target BS and can start receiving data from the target BS. In an aspect, the source and the target BSs may be distributed units (DUs)/transmission reception points (TRPs) associated with different gNBs or the same gNB. Generally, during the MBB handover the UE maintains two separate protocol stacks. Thus, the MBB handover is also referred to as dual active protocol stack (DAPs) handover.

Figure 3:
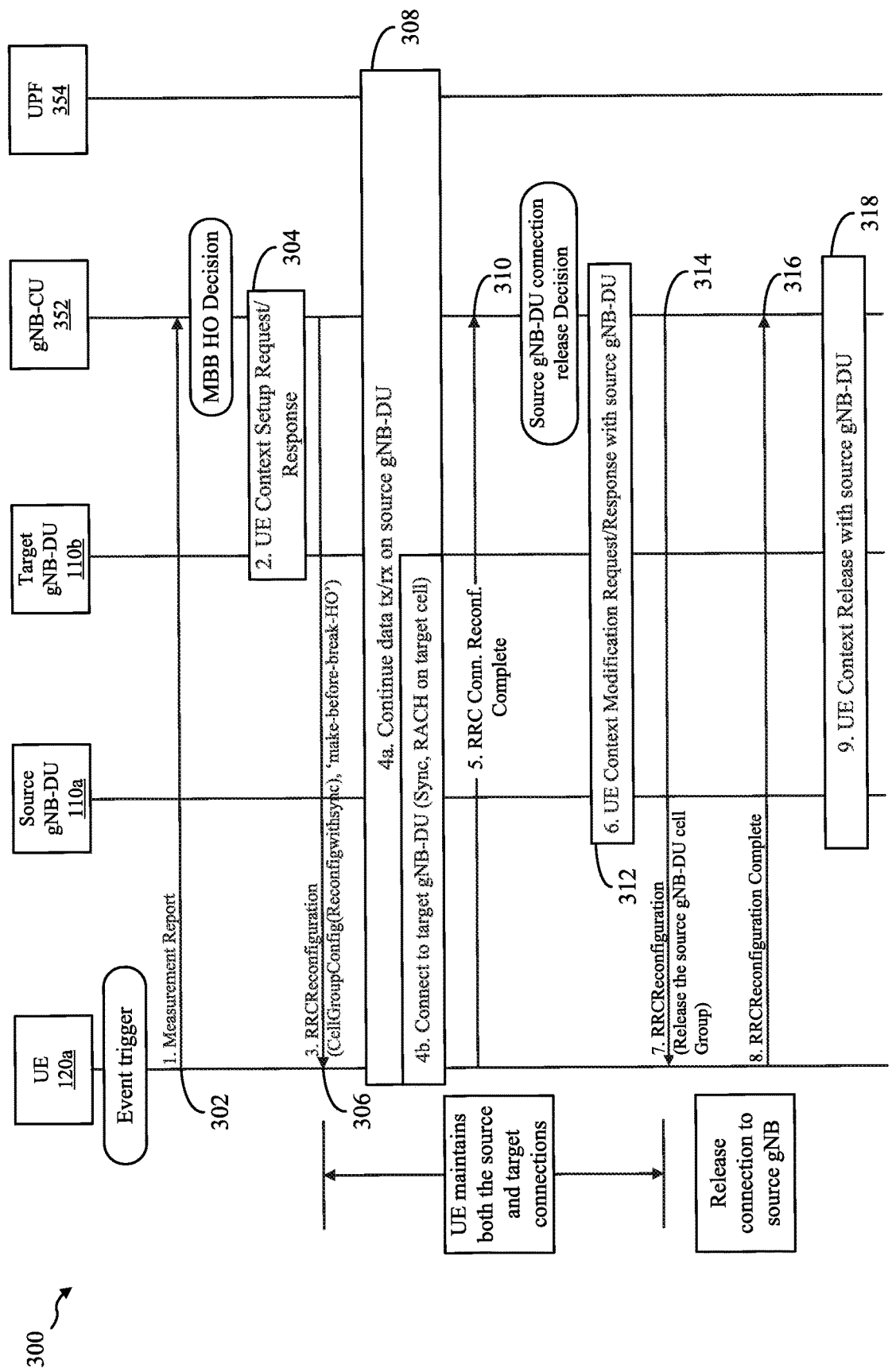
FIG. 3 illustrates an example make-before-break (MBB) handover procedure, in accordance with certain aspects of the present disclosure.

FIG. 3 is a call-flow diagram 300 illustrating an example process for a make-before-break (MBB) handover between a UE 120a and at least a source cell (e.g., such as cell 102a or cell 102b of the wireless communication network 100 of FIG. 1) corresponding to a source gNB (e.g., such as BS 110a or BS 110b of the wireless communication network 100 of FIG. 1), and a target cell (e.g., such as the cell 102a or cell 102b of the wireless communication network 100 of FIG. 1) corresponding to a target gNB (e.g., such as BS 110a or BS 110b of the wireless communication network 100 of FIG. 1). FIG. 3 also includes a gNB central unit (CU) 352 and a core network (CN) user plane function (UPF) 354.

In certain aspects, at a first step 302, an event trigger may occur at the UE 120a causing the UE 120a to communicate a measurement report with the gNB-CU 352. For example, the measurement report may indicate to the gNB-CU 352 that the UE 120a initiated an MBB handover. Accordingly, gNB-CU can make an MBB handover decision in response to receiving the measurement report. The measurement report may be triggered by a determination by the UE 120a that relative value(s) of one or more criteria (e.g., received power, received quality, path loss, etc.) associated with signaling received from the source gNB 110a are less than a threshold value.

At a second step 304, gNB-CU 352 and target gNB-DU 110b may generate a UE context setup request/response. At a third step 306, the gNB-CU 352 may transmit a radio resource control (RRC) reconfiguration message to the UE 120a. In some examples, the RRC reconfiguration message includes a "make-before-break-HO" indication requesting the UE 120a to perform MBB handover procedures. For example, the RRC Reconfiguration message may include CellGroupConfig (Reconfigwithsync) information. On receiving the RRC reconfiguration message, UE 120a maintains the connection to the source gNB-DU 110a cell even while establishing the connection to the target gNB-DU 110b cell. That is, the UE 120a can transmit and receive data via the source cell during handover.

At a fourth step 308, the UE 120a may continue data transmission and reception with the source gNB-DU 110a. The UE 120a may also connect to the target cell via synchronization and RACH procedures with the gNB-DU 110b. Upon connection with the target gNB-DU, at a fifth step 310, the UE 120a may transmit an "RRC Connection Reconfiguration Complete" message to the gNB-CU 352. Upon reception of the RRC Connection Reconfiguration Complete message, the gNB-CU may determine a release decision.

At a sixth step 312, source gNB-DU 110a, target gNB-DU 110b, and gNB-CU 352 may determine a UE Context Modification Request/Response with the source gNB-DU 110a. At a seventh step 314, the gNB-CU 352 may transmit an RRC Reconfiguration message that releases the source gNB-DU 110a cell. Upon reception of the RRC Reconfiguration message, the UE 120a may release connection to the source gNB.

At an eighth step 316, the UE 120a may transmit a RRC Reconfiguration Complete message to gNB-CU 352. At a ninth step 318, gNB-CU 352 and target gNB-DU 110b determine a UE Context Release with the source gNB-DU 110a.

Example Prioritization of Uplink Transmissions During MBB Handover

In certain cases, source and target next generation nodeBs (gNBs) may not coordinate the assignment of resources (e.g., time and frequency resources) for communication with devices (e.g., user equipments (UEs)) in respective source and target cells. This lack of coordination between the source and target gNBs may lead to the source and target gNBs configuring overlapping uplink (UL) and/or downlink (DL) resources for communication with the same UE, for example, during a make-before-break (MBB) handover. For example, both the source and target gNBs may configure a same slot or portion of a same slot for UL and/or DL communication with the UE. In certain cases, different gNBs may use different beams for communication with devices in their respective cells. However, generally, a UE can communicate using only one beam at a time. Thus, during the MBB handover when the UE is expected to communicate simultaneously with both the source and target cells, if the slot assignments for the source and target cells overlap, the UE cannot simultaneously communicate with both cells using their respective beams.

In certain cases, even if the resource assignments of the source and target cells may not overlap, the time difference between the resource assignments of the cells may not be long enough so that the UE can switch beams. Generally, the UE requires a minimum amount of time to switch beams. Thus, if the time interval between resource assignments of a source cell and a target cell using different beams is less than the minimum required threshold time, the UE after communicating (e.g., UL or DL) using a first resource (e.g., a first slot) of a first cell (e.g., source or target cell) may not be able to switch beams in time to communicate using a second resource (e.g., a second slot) of a second cell (the other one of the source or target cell).

Additionally or alternatively, most UEs generally are unable to communicate simultaneously on the UL and DL direction. Thus, even assuming that the source and target cells use the same beam for communication, when the source and target cells have overlapping resources or near overlapping resources (e.g., time difference of assignments less than the minimum threshold time) scheduled for communication in opposite directions (e.g., UL for first cell and DL for the second cell), the UE cannot simultaneously transmit in the UL direction to one cell and receive in the DL direction from the other cell.

Figure 4A:
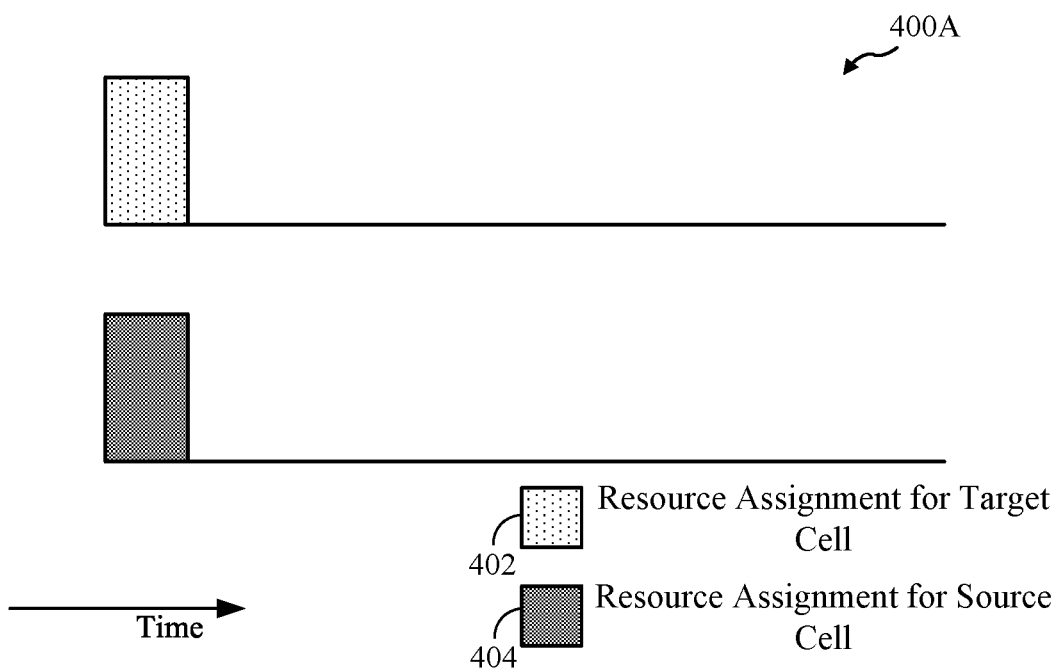
FIG. 4A illustrates an example resource assignment timeline having overlapping resource assignments for a source cell and a target cell during a MBB handover, in accordance with certain aspects of the present disclosure.

FIG. 4A illustrates an example resource assignment timeline 400A having overlapping resource assignments for a source cell and a target cell during a MBB handover.

As shown in FIG. 4A, resource 402 is assigned for the target cell and resource 404 is assigned for the source cell. In an aspect, each of the resources 402 and 404 may represent a slot, portion of a slot (e.g., one or more symbols of a slot), a subframe, or a portion of a subframe, or any other time and frequency resource that may be used to represent assignment of resources for transmission within a cell. In an aspect, each of the resources 402 and 404 may be assigned for transmission on the UL or the DL. For example, each resource 402 or 404 may be assigned for transmission of a physical downlink control channel (PDCCH), physical downlink shared channel (PDSCH), physical uplink control channel (PUCCH) or a physical uplink shared channel (PUSCH).

As shown in FIG. 4A, the resource 402 assigned for communication in the target cell (e.g., communication between the UE and the target cell during the MBB handover) overlaps the resource 404 assigned for communication in the source cell (e.g., communication between the UE and the source cell during the MBB handover). It may be noted that while FIG. 4A illustrates the resources 402 and 404 fully overlapping each other, these resource 402 and 404 may partially overlap. For example, one or more symbols of the resource 402 may overlap with one or more symbols of the resource 404.

In an aspect, the source and the target cells may use different beams for communicating with the UE. As noted above, the UE is capable of communicating using only a single beam at a time. Thus, in the example case shown in FIG. 4A, when the UE is expected to communicate simultaneously with both the source gNB of the source cell and the target gNB of the target cell (e.g., during the MBB handover) using the overlapping resources 402 and 404, the UE can communicate with only one of the source or target gNBs using the respective assigned resource for the cell. It may be noted that this limitation applies even when the resources 402 and 404 partially overlap.

Figure 4B:
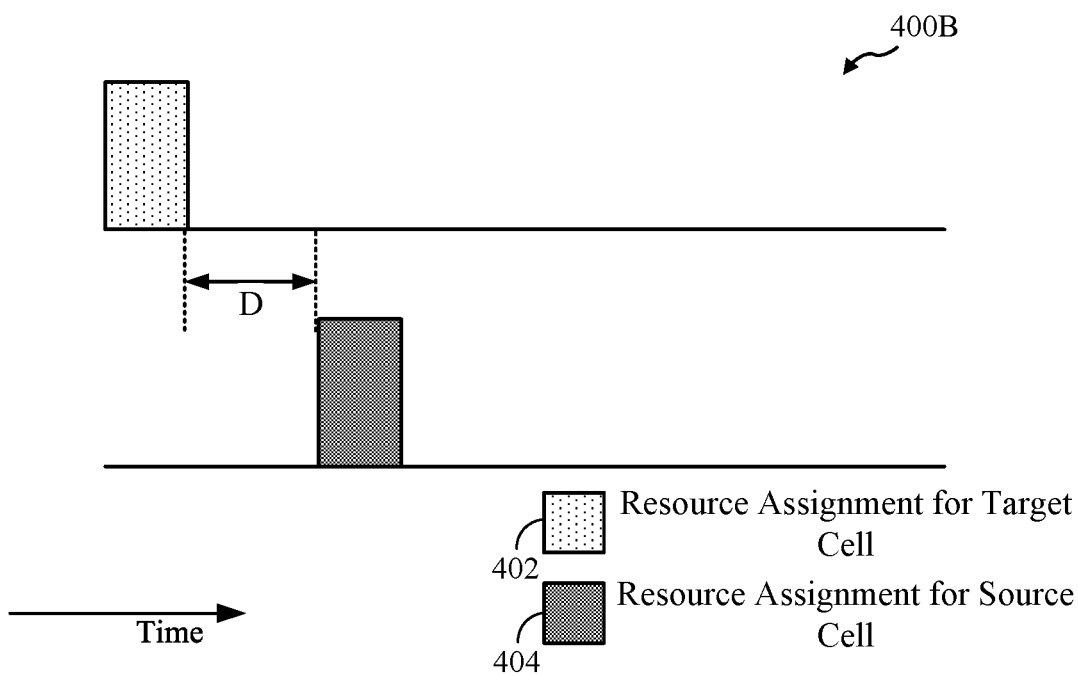
FIG. 4B illustrates an example resource assignment timeline having a time interval between resource assignments for a source cell and a target cell less than a minimum required threshold during a MBB handover, in accordance with certain aspects of the present disclosure.

FIG. 4B illustrates an example resource assignment timeline 400B having a time interval between resource assignments for a source cell and a target cell less than a minimum required threshold during a MBB handover.

As shown in FIG. 4B, the resources 402 and 404 of the target and source cells respectively do not overlap. As shown, the resources 402 and 404 are separated by a time interval D. In certain cases, the time interval D between the resources 402 and 404 may be less than a minimum required threshold time required by the UE to switch beams. For example, as a result of the time interval D being less than the required threshold, the UE, after communicating with the target gNB on a first beam using the resource 402, may not have sufficient time to switch to a second beam to communicate with the source gNB using the resource 404.

Thus, assuming that a first transmission is scheduled using the resource 402 by the target gNB and a second transmission is scheduled using the resource 404 by the source gNB during the MBB handover scenario, and when the resources 402 and 404 assigned for the target and source cells respectively at least partially overlap in time (as shown in FIG. 4A) or when the time interval (D) between the resources 402 and 404 of the source and target cells is less than a minimum required threshold time for the UE (as shown in FIG. 4B), the UE needs to select one of first and second transmissions.

Aspects of the present disclosure provide techniques for selecting between UL transmissions scheduled by the source and target cells on at least partially overlapping resources 402 and 404 or when the time interval (D) between the resources 402 and 404 of the source and target cells is less than a minimum required threshold time, when the UE is expected to communicate simultaneously with the source and target cells during the MBB handover of the UE between the source and target cells.

FIG. 5 illustrates example operations 500 performed by a UE. For example, operations 500 may be performed by the UE (e.g., such as the UE 120a in FIG. 1 or FIG. 2) for selecting between overlapping uplink transmissions during a MBB handover of the UE between a source BS and a target BS, in accordance with certain aspects of the present disclosure.

Operations 500 begin, at 502, by detecting that the UE is simultaneously connected to a source BS of a source cell and a target BS of a target cell during a handover of the UE from the source cell to the target cell.

At, 504, the UE detects during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission.

At 506, the UE transmits one of the first or second uplink transmissions at the respective first or second transmission time, wherein a decision relating to transmitting which one of the first or second uplink transmissions is based on a priority associated with at least one of the first uplink transmission or the second uplink transmission.

Figure 6:
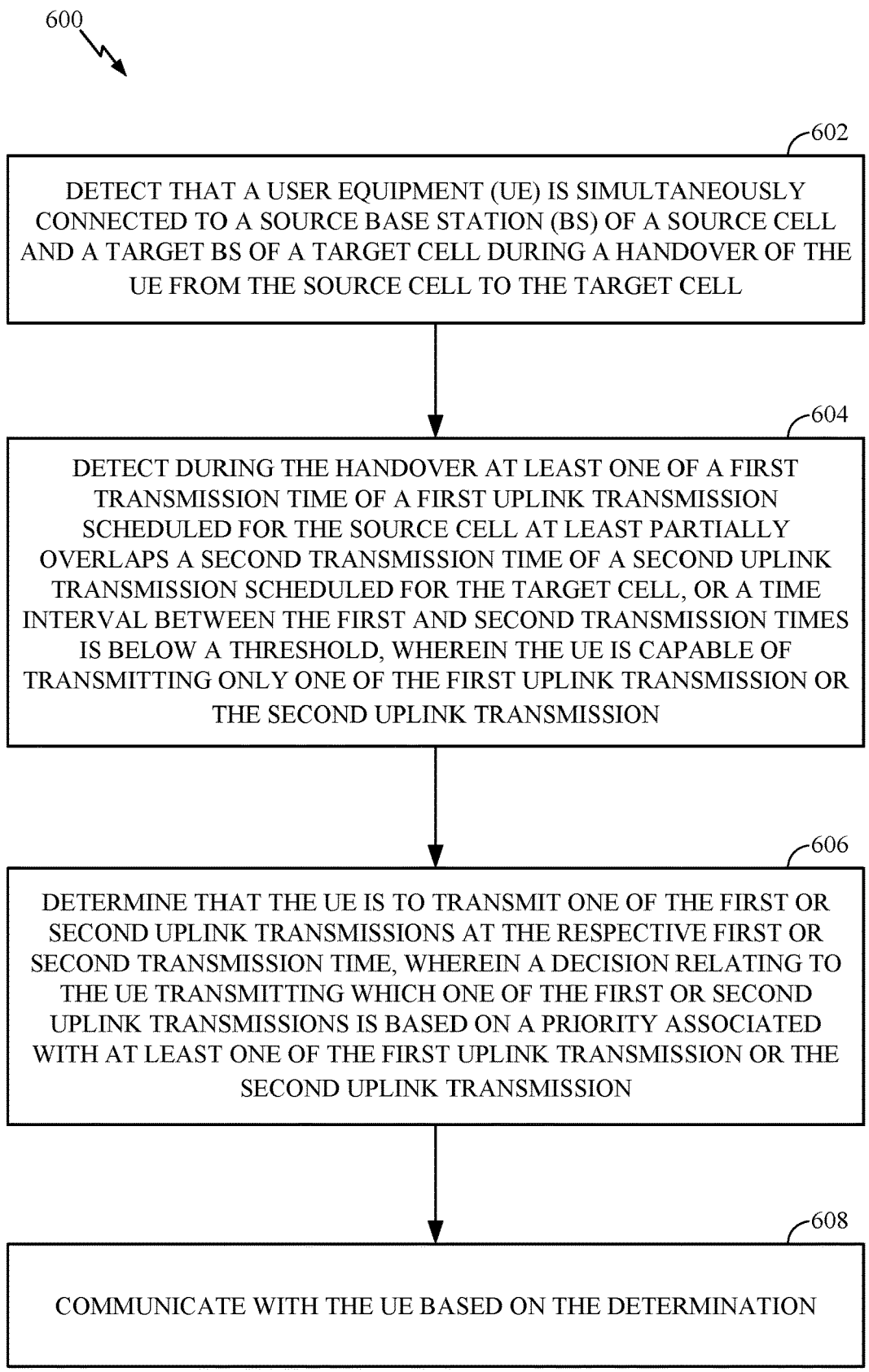
FIG. 6 illustrates example operations performed by a network entity for selecting between overlapping uplink transmissions during a MBB handover of a UE between a source BS and a target BS, in accordance with certain aspects of the present disclosure.

FIG. 6 illustrates example operations 600 performed by a network entity that may be considered complementary to operations 500 of FIG. 5. For example, operations 600 may be performed by a BS (e.g., such as the BS 110a of FIG. 1 or FIG. 2) that may for selecting between overlapping uplink transmissions during a MBB handover of a UE between a source BS and a target BS, in accordance with certain aspects of the present disclosure.

Operations 600 begin, at 602, by detecting that the UE is simultaneously connected to a source BS of a source cell and a target BS of a target cell during a handover of the UE from the source cell to the target cell.

At 604, the network entity detects during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission.

At 606, the network entity determines that the UE is to transmit one of the first or second uplink transmissions at the respective first or second transmission time, wherein a decision relating to the UE transmitting which one of the first or second uplink transmissions is based on a priority associated with at least one of the first uplink transmission or the second uplink transmission.

At 608, the network entity communicates with the UE based on the determination.

In an aspect, the network entity includes at least one of the source BS, the target BS, a core network entity (e.g., gNB-CU 452) controlling both the source BS and the target BS, a core network entity (e.g., gNB-CU) controlling one of the source BS or the target BS, or a combination thereof.

In an aspect, the network entity decides that the UE is to transmit the one of the first or second uplink transmissions at the respective first or second transmission time, based on the priority associated with at least one of the first uplink transmission or the second uplink transmission. The network entity transmits an indication of the decision to the UE. The UE selects between the first and second uplink transmissions based on the indication received from the network entity.

In an aspect, the UE locally decides that the UE is to transmit which one of the first or second uplink transmissions at the respective first or second transmission time, based on the priority associated with at least one of the first uplink transmission or the second uplink transmission. In an aspect, the UE transmits an indication of the decision to the network (e.g., source gNB and/or target gNB).

In an aspect, the UE may transmit one of the first or second uplink transmissions having a higher assigned priority.

In certain aspects, a priority may be assigned to a transmission for the source cell or the target cell based on a priority associated with the cell. For example, a transmission may be assigned a higher priority if the priority associated with the corresponding cell for which the transmission is scheduled has a higher priority. For example, if the source cell has a higher associated priority, an uplink transmission to the source gNB is assigned a higher priority over an uplink transmission to the target gNB. In an aspect, the priority associated with each of the source cell and the target cell is determined based on at least one of a type of communication between the UE and each of the source gNB and the target gNB, or a signal strength between the UE and each of the source gNB and the target gNB.

In certain aspects, priorities may be assigned to the source and the target cells based on a current stage of the handover, a signal strength relating to communication between the UE and each of the source and target gNBs, or a combination thereof. For example, by default, the target cell may be assigned a higher priority than the source cell when a decision is made (e.g., by a the NR core network entity such as CU) to handover the UE from the source cell to the target cell. This way the UE resources (e.g., RF chain and processing resources) may be assigned for communicating with the target cell as soon as the handover decision is made in order to ensure that the handover is completed efficiently and as quickly as possible. In an aspect, additionally or alternatively, the priorities may be assigned based on signal strengths relating to communication between the UE and each of the source and target gNBs. For example, a link with a higher signal strength is assigned a higher priority. In certain cases, a decision to handover the UE from the source to the target cell is generally made when the signal strength of the link between the UE and the source gNB falls below a threshold signal strength and/or the signal strength of the link between the UE and the target gNB exceeds a threshold signal strength. For example, when the signal strength of the link between the UE and the target gNB exceeds a threshold signal strength there is a higher likelihood that the UE can successfully handover to the target cell. In this case, the target cell may be assigned a higher priority and more resources may be used to communicate with the target cell. On the other hand, if the signal strength of the target gNB link falls below a threshold and the signal strength of the source gNB link is still not deteriorated too much, the source cell may be assigned a higher priority and more resources may be assigned for communicating with the source cell in order to ensure that the UE can continue to communicate with the source cell in the event that the handover to the target is unsuccessful. In an aspect, the priorities of the source and the target cells may be dynamically assigned based on the signal strengths of the links between the UE and each of the source and target gNBs. The resources assigned to each of the source and target cells may be dynamically adjusted with changing priorities of the cells.

In an aspect, the signal strength may be indicated by a value of reference signal received power (RSRP) or reference signal received quality (RSRQ) as measured by the UE. In an aspect, the UE reports to one of the source or target gNBs information relating to the signal strengths of the links between the UE and each of the source and target gNBs. The receiving gNB determines the priorities of the cells based on the received signal strengths of the links and assigns priorities of uplink transmissions by the UE to the source and target gNBs based on the cell priorities.

In certain aspects, a priority may be assigned to an uplink transmission for the source cell or the target cell based on a type of uplink channel scheduled to be transmitted by the transmission. For example, a priority may be assigned to a particular uplink transmission to the respective source or target cell, based on whether the particular transmission to the respective cell is for transmission of PUCCH or PUSCH. For example, in the initial stages of an MBB handover when the UE is still trying to establish communication with the target gNB, UE may need to exchange control signaling with the target gNB to aid in establishing the connection while still relying on the source gNB for data communication. At this stage the UE may assign a higher priority to an uplink control transmission on the PUCCH to the target cell as compared to an uplink data transmission on the PUSCH. On the other hand, the UE may assign a higher priority to an uplink data transmission on the PUSCH to the source cell as compared to an uplink control transmission on the PUCCH.

In certain aspects, a priority may be assigned to an uplink transmission for the source cell or the target cell based on a time of transmission by the respective gNB or time of reception by the UE. In an aspect, a higher priority is assigned an earlier transmission. In some cases, when the time interval between uplink transmissions scheduled for the source and target cells is less than the minimum required threshold time, the earlier scheduled uplink transmission is assigned a higher priority. In some cases, when the resources assigned for uplink transmissions to the source and target gNBs partially overlap (e.g. overlapping slot), a first transmission may be scheduled to begin one or more symbols earlier than a second transmission. In this case, the transmission that is scheduled to begin at an earlier symbol is assigned a higher priority.

In certain aspects, a priority may be assigned to an uplink transmission for the source cell or the target cell based on a random scheme, and the UE may transmit the uplink transmission that was randomly assigned a higher priority.

In certain aspects, a network entity (e.g., the source gNB, the target gNB or gNB-CU) may assign priorities to the uplink transmissions scheduled for each of the source and target cells. The network may indicate the determined priorities of the uplink transmissions to the UE. The UE communicates with the source and target gNBs based on the priorities of the uplink transmissions indicated by the network. For example, when the uplink transmissions of the source and target gNBs at least partially overlap or when the time difference between the source and target uplink transmissions is less than the minimum required threshold time, the UE transmits the uplink transmission indicated by the network as having a higher assigned priority.

In certain aspects, the UE transmits one of the uplink transmissions with a higher associated priority and drops the other lower priority uplink transmission.

In certain aspects, the UE, instead of dropping the lower priority transmission, transmits the lower priority transmits to the respective cell in the next available slot. In an aspect, the network may schedule a shifted slot for transmission of the lower priority transmission. For example, the shifted slot is the next available slot after the originally scheduled slot for the lower priority transmission.

In certain aspects, the UE may jointly transmit uplink transmissions of the source and target cells to one of the source or target gNBs. In an aspect, the receiving gNB forwards the joint transmission to the other gNB over a backhaul connection between the source and target gNBs. For example, when PUCCH transmissions are scheduled for the source and target cells on at least partially overlapping uplink resources or when a time difference between the resources is less than a minimum threshold, the UE jointly decodes PUCCH transmissions of both cells and transmits the jointly decoded transmission to one of the source or target gNBs. The receiving gNB extracts its PUCCH transmission from the jointly coded transmission and forwards the jointly coded transmission to the other gNB over the backhaul connection. In an aspect, the receiving gNB extracts PUCCH transmissions for both source and target cells, and forwards to the other gNB only the extracted PUCCH transmission scheduled for the gNB. In an aspect, the UE may transmit the joint uplink transmission to the gNB having a higher assigned priority using a spatial relation state (e.g., transmit beam) of the selected cell for the joint transmission. In an aspect, the network may indicate to the UE which of the source or target gNBs the joint transmission is to be transmitted by the UE.

Figure 7A:
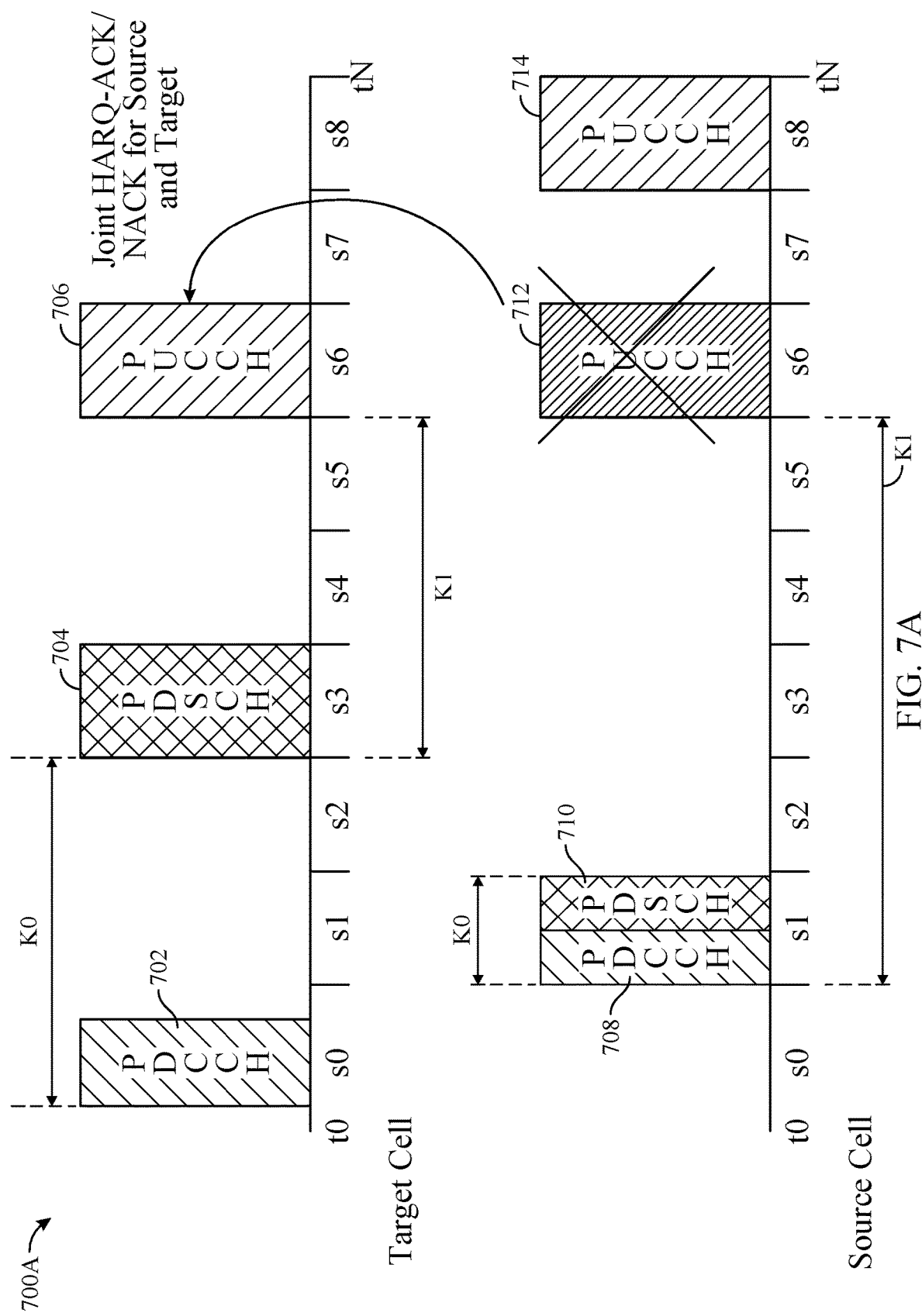
FIG. 7A illustrates an example timeline showing joint uplink transmission and shifted uplink transmission, in accordance with certain aspects of the present disclosure.

FIG. 7A illustrates an example timeline 700A showing joint uplink transmission and shifted uplink transmission, in accordance with certain aspects of the present disclosure.

As shown in FIG. 7A, the timeline 700A illustrates a timeline for transmissions scheduled for the target cell and a timeline for transmissions scheduled by the source cell. As shown, the target and source timelines show resource assignments between time t0 and tN over slots s0-s8. As shown, the target cell configures a PDCCH transmission 702 at s0. The PDCCH transmission 702 schedules a PDSCH transmission 704 K0 slots from the PDCCH transmission 702 at s3. A PUCCH transmission 706 is scheduled in s6, K1 slots from the PDSCH transmission 704, wherein the PDSCH transmission 704 is to be used by the UE to transmit HARQ ACK/NACK to the target gNB to indicate whether the UE correctly received the PDSCH transmission 704.

The source cell configures PDCCH transmission 708 in s1. The PDCCH transmission 708 schedules a PDSCH transmission 710 in the same slot. The same slot scheduling of the PDSCH transmission 710 is indicated by K0=0. A PUCCH transmission 712 is scheduled in s6, K1 slots from the PDSCH transmission 710, wherein PUCCH transmission 712 is to be used by the UE to transmit HARQ ACK/NACK to the source gNB to indicate whether the UE correctly received the PDSCH transmission 710.

As shown, the PUCCH transmission 706 for the target cell and the PUCCH transmission 712 for the source cell are scheduled in overlapping slots s6. Thus, the UE needs to select one of the PUCCH transmissions 706 or 712 for transmission in the allotted slot s6.

In an aspect, as shown in FIG. 7A, the UE jointly transmits the HARQ ACK/NACK of both the target and source cells in the PUCCH transmission 706 using the spatial relation state (e.g., beam) of the target cell. As noted above, the target gNB may receive a jointly PUCCH transmission and forward the same to the source gNB over a backhaul connection between the source and target gNBs.

Additionally or alternatively, as shown in FIG. 7A, the UE may transmit the PUCCH transmission 712 to the source gNB in a next available slot s8 as PUCCH transmission 714. In an aspect, the network may schedule the shifted PUCCH transmission 714. For example, the network may schedule the shifted PUCCH transmission 714 at K1+Δ, where Δ=2 slots.

Figure 7B:
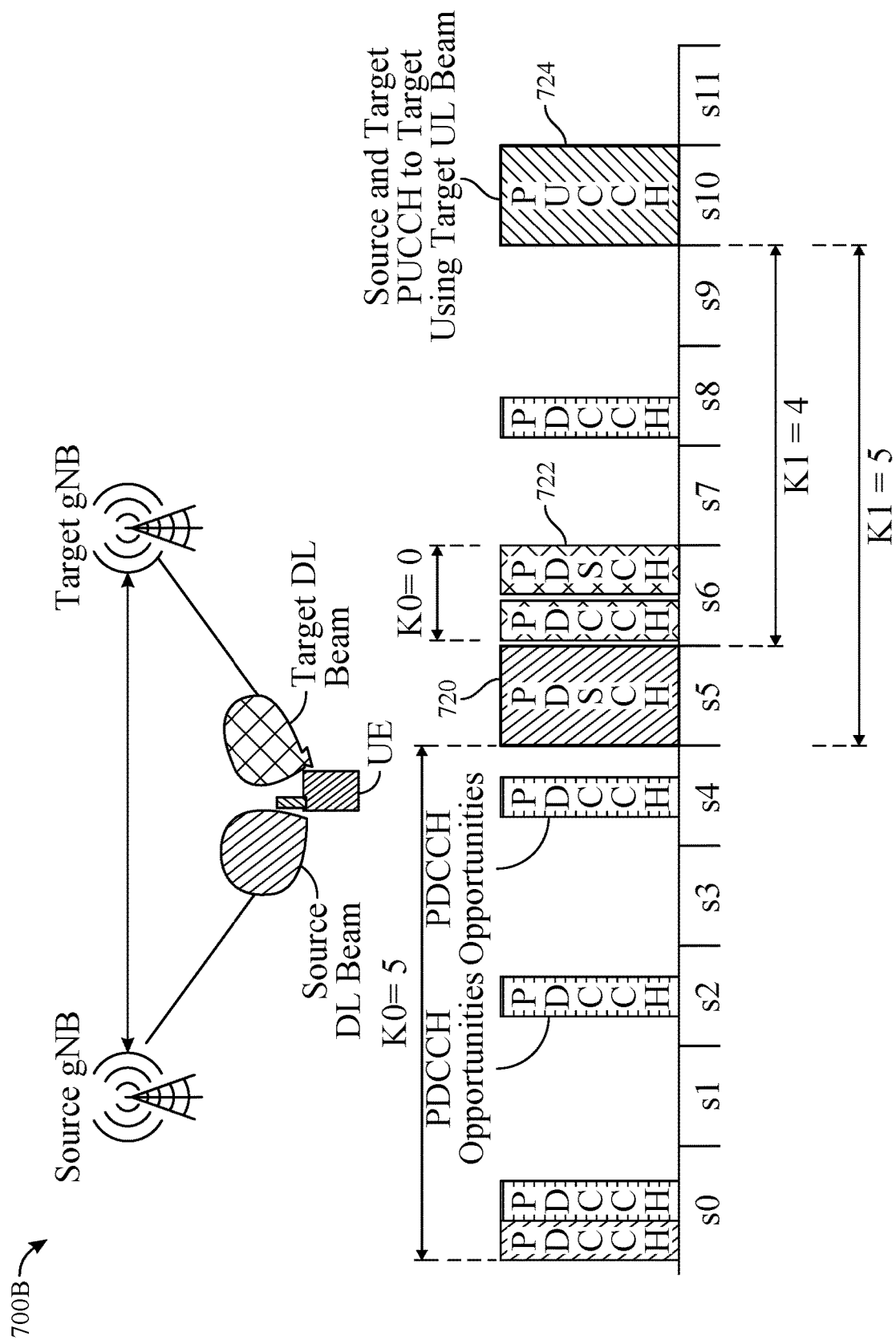
FIG. 7B shows an alternate illustration of a timeline for joint uplink transmission, in accordance with certain aspects of the present disclosure.

FIG. 7B shows an alternate illustration of a timeline 700B for joint uplink transmission, in accordance with certain aspects of the present disclosure.

As shown in FIG. 7B, HARQ ACK/NACK transmissions corresponding to PDSCH transmission 720 of the source cell and PDSCH transmission 722 of the target cell are scheduled in an overlapping slot s10. As shown, PUCCH transmission corresponding to the PDSCH transmission 720 of the source cell in s5 is scheduled K1=5 slots from the beginning of the slot s5. Similarly, the PUCCH transmission corresponding to the PDSCH transmission 722 of the source cell in s6 is scheduled K1=4 slots from the beginning of the slot s6. As shown, a PUCCH transmission 724 for both the source and target cells are jointly transmitted to the target cell in slot s10 using the spatial relation state (e.g., uplink beam) of the target cell.

In certain aspect, the UE may transmit the joint uplink transmission to both the source and target gNBs using their respective spatial relations (e.g., uplink beams). Each of the receiving gNBs may extract its uplink transmission from the received joint uplink transmission.

Figure 8:
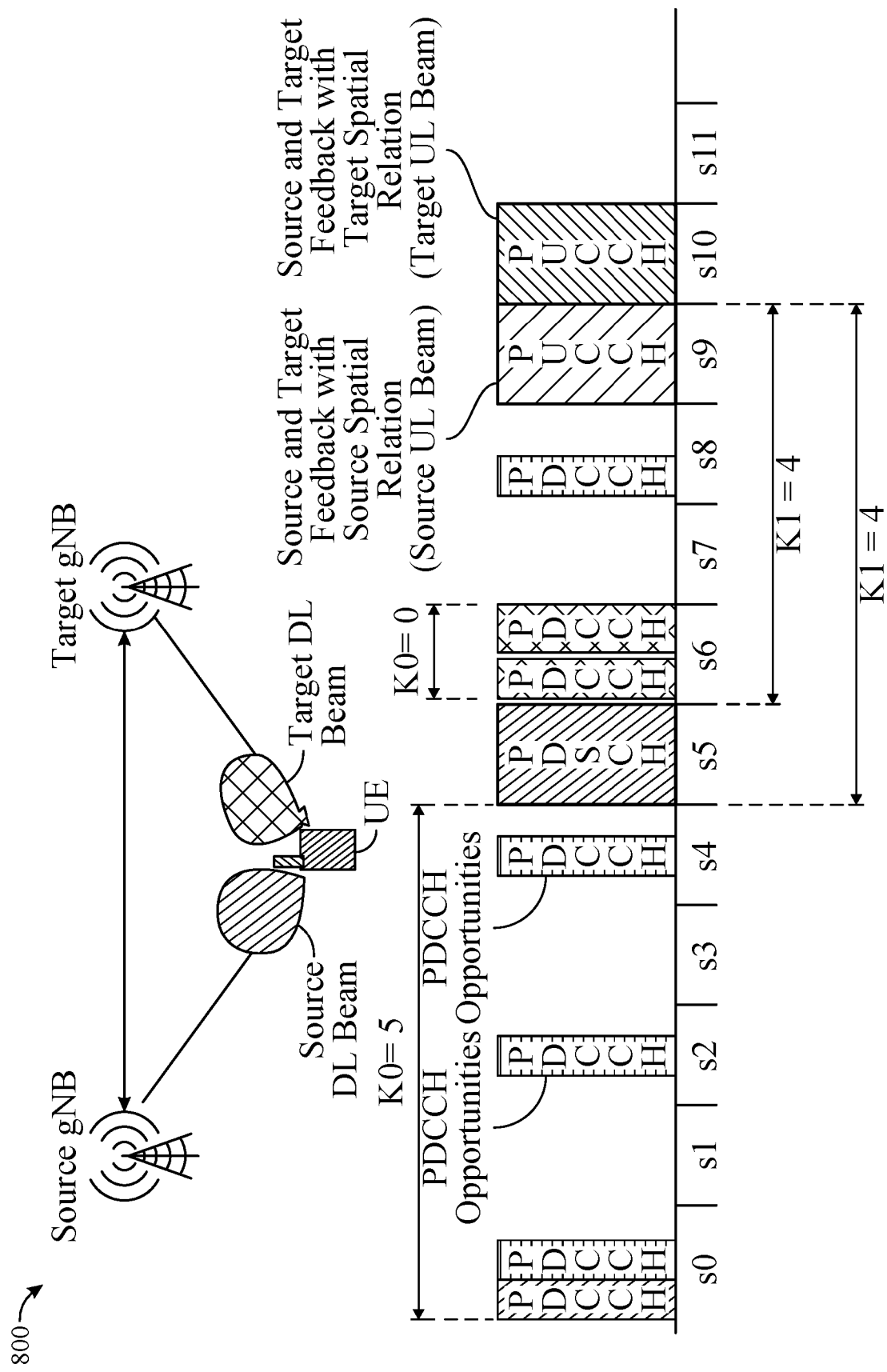
FIG. 8 illustrates an example timeline for joint uplink transmission to both source and target cells, in accordance with certain aspects of the present disclosure.

FIG. 8 illustrates an example timeline 800 for joint uplink transmission to both source and target cells, in accordance with aspects of the present disclosure.

As shown in FIG. 8, the UE transmits a joint PUCCH transmission to the source gNB at s9 using spatial relation state of the source gNB (e.g., source UL beam). The UE then repeats the joint PUCCH transmission at s10 using spatial relation state of the target gNB (e.g., target UL beam). As noted above, each the receiving gNBs may extract its uplink information from the received joint PUCCH transmission. In an aspect, this technique eliminates the need for a backhaul connection between the source and target gNBs as both the source and target gNBs receive the joint transmission, and thus, there is no need to forward the joint transmission between the gNBs. In an aspect, which of the source or target gNBs the UE will first transmit the joint PUCCH transmission may be indicated by the network. In alternative aspects, the UE may decide randomly to which of the source or target gNBs the UE will first transmit the joint PUCCH transmission.

Figure 9:
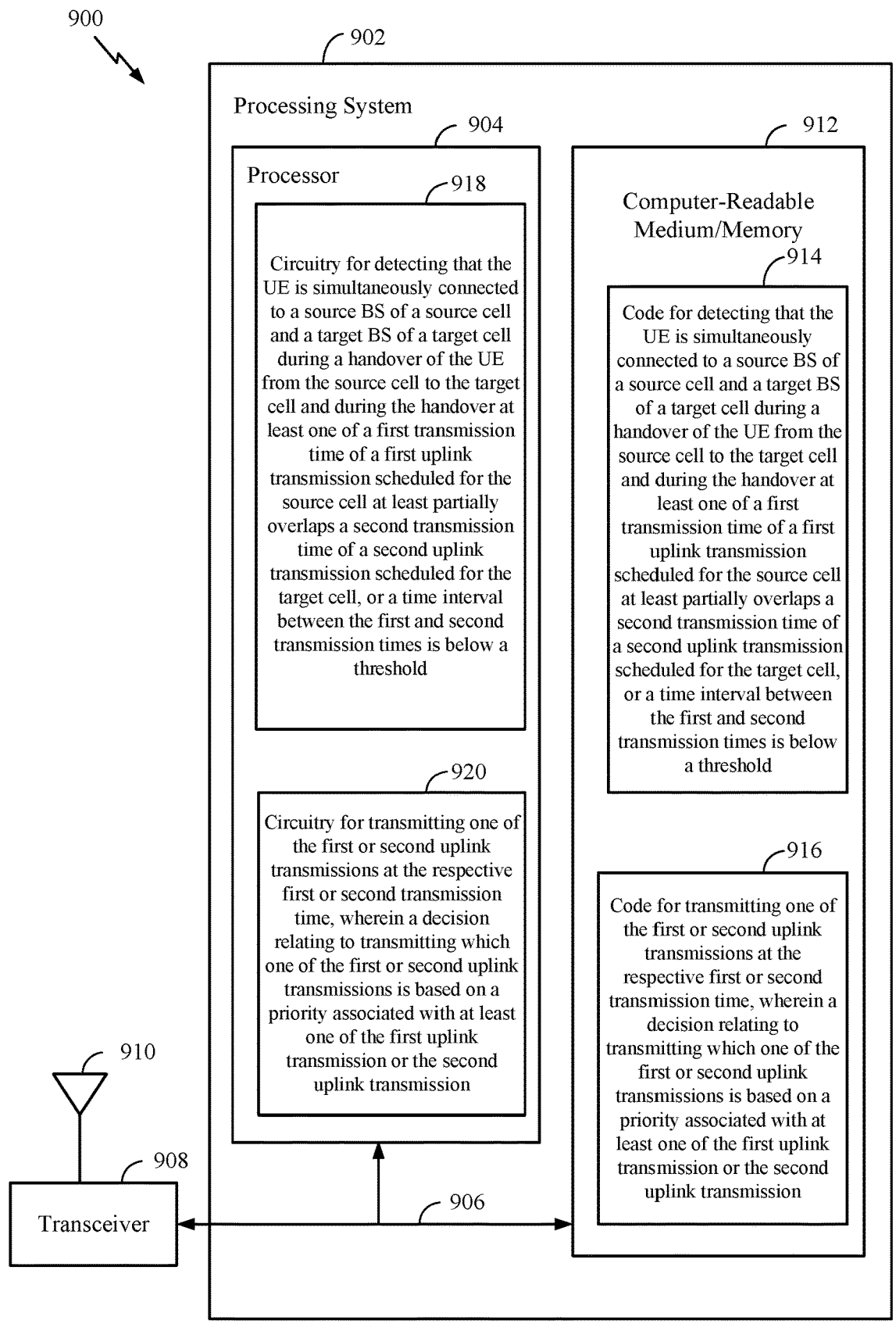
FIG. 9 illustrates a communications device that may include various components configured to perform operations for techniques disclosed herein, in accordance with certain aspects of the present disclosure.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 is configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., a computer-executable code) that when executed by the processor 904, cause the processor 904 to perform the operations illustrated in FIG. 5, or other operations for performing the various techniques discussed herein for prioritizing overlapping or near overlapping uplink transmissions for a source BS and a target BS during a MBB handover of a UE from the source BS to the target BS. In certain aspects, computer-readable medium/memory 912 stores code 914 for detecting and code 916 for transmitting. The code 914 for detecting may include code for detecting that the UE is simultaneously connected to a source BS of a source cell and a target BS of a target cell during a handover of the UE from the source cell to the target cell, and during the handover at least one of a first transmission time of a first uplink transmission scheduled for the source cell at least partially overlaps a second transmission time of a second uplink transmission scheduled for the target cell, or a time interval between the first and second transmission times is below a threshold where the UE is capable of transmitting only one of the first uplink transmission or the second uplink transmission. The code 916 for transmitting may include code for transmitting one of the first or second uplink transmissions at the respective first or second transmission time where a decision relating to transmitting which one of the first or second uplink transmissions is based on a priority associated with at least one of the first uplink transmission or the second uplink transmission.

The processor 904 may include circuitry configured to implement the code stored in the computer-readable medium/memory 912, such as for performing the operations illustrated in FIG. 5, as well as other operations for performing the various techniques discussed herein for prioritizing overlapping or near overlapping uplink transmissions for a source BS and a target BS during a MBB handover of a UE from the source BS to the target BS. For example, the processor 904 includes circuitry 918 for detecting and circuitry 920 for transmitting. The circuitry 918 for detecting may include circuitry for detecting that the UE is simultaneously connected to a source BS of a source cell and a target BS of a target cell during a handover of the UE from the source cell to the target cell, and during the handover at least one of a first transmission time of a first uplink transmission scheduled for the source cell at least partially overlaps a second transmission time of a second uplink transmission scheduled for the target cell, or a time interval between the first and second transmission times is below a threshold where the UE is capable of transmitting only one of the first uplink transmission or the second uplink transmission. The circuitry 920 for transmitting may include circuitry for transmitting one of the first or second uplink transmissions at the respective first or second transmission time where a decision relating to transmitting which one of the first or second uplink transmissions is based on a priority associated with at least one of the first uplink transmission or the second uplink transmission.

Figure 10:
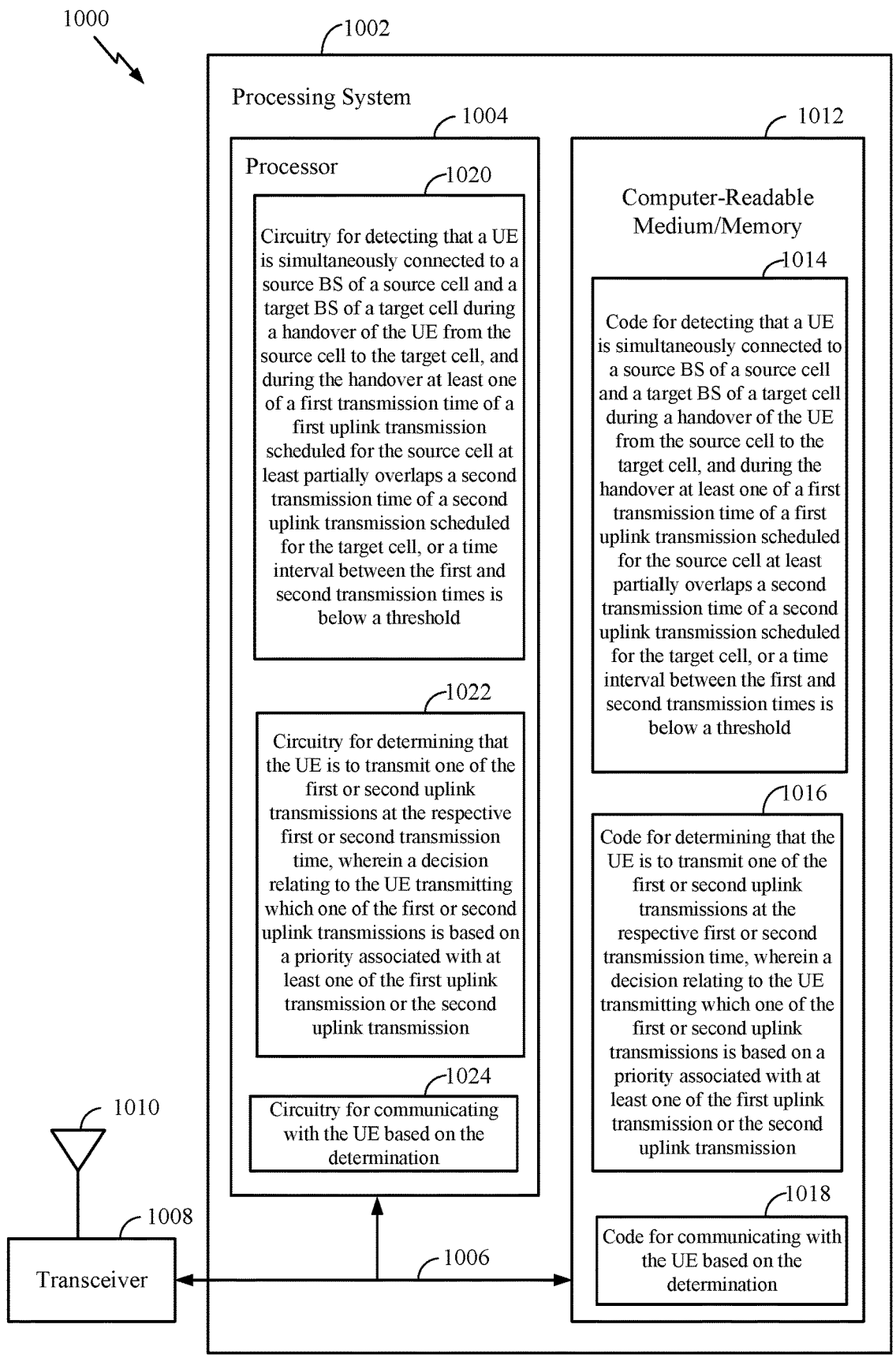
FIG. 10 illustrates a communications device that may include various components configured to perform operations for techniques disclosed herein, in accordance with certain aspects of the present disclosure.

FIG. 10 illustrates a communications device 1000 that may include various components (e.g., corresponding to means-plus-function components) configured to perform operations for the techniques disclosed herein, such as the operations illustrated in FIG. 6. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 is configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., a computer-executable code) that when executed by the processor 1004, cause the processor 1004 to perform the operations illustrated in FIG. 6, or other operations for performing the various techniques discussed herein for prioritizing overlapping or near overlapping uplink transmissions for a source BS and a target BS during a MBB handover of a UE from the source BS to the target BS. In certain aspects, computer-readable medium/memory 1012 stores code 1014 for detecting, code 1016 for determining, and code 1018 for communicating. The code 1014 for detecting may include code for detecting that a UE is simultaneously connected to a source BS of a source cell and a target BS of a target cell during a handover of the UE from the source cell to the target cell, and during the handover at least one of a first transmission time of a first uplink transmission scheduled for the source cell at least partially overlaps a second transmission time of a second uplink transmission scheduled for the target cell, or a time interval between the first and second transmission times is below a threshold where the UE is capable of transmitting only one of the first uplink transmission or the second uplink transmission. The code 1016 for determining may include code for determining that the UE is to transmit one of the first or second uplink transmissions at the respective first or second transmission time where a decision relating to the UE transmitting which one of the first or second uplink transmissions is based on a priority associated with at least one of the first uplink transmission or the second uplink transmission. The code 1018 for communicating may include code for communicating with the UE based on the determination.

The processor 1004 may include circuitry configured to implement the code stored in the computer-readable medium/memory 1012, such as for performing the operations illustrated in FIG. 6, as well as other operations for performing the various techniques discussed herein for prioritizing overlapping or near overlapping uplink transmissions for a source BS and a target BS during a MBB handover of a UE from the source BS to the target BS. For example, the processor 1004 includes circuitry 1020 for detecting, circuitry 1022 for determining, and circuitry 1024 for communicating. The circuitry 1020 for detecting may include circuitry for detecting that a UE is simultaneously connected to a source BS of a source cell and a target BS of a target cell during a handover of the UE from the source cell to the target cell, and during the handover at least one of a first transmission time of a first uplink transmission scheduled for the source cell at least partially overlaps a second transmission time of a second uplink transmission scheduled for the target cell, or a time interval between the first and second transmission times is below a threshold where the UE is capable of transmitting only one of the first uplink transmission or the second uplink transmission. The circuitry 1022 for determining may include circuitry for determining that the UE is to transmit one of the first or second uplink transmissions at the respective first or second transmission time where a decision relating to the UE transmitting which one of the first or second uplink transmissions is based on a priority associated with at least one of the first uplink transmission or the second uplink transmission. The circuitry 1024 for communicating may include circuitry for communicating with the UE based on the determination.

Example Embodiments

Embodiment 1: A method for wireless communication by a user equipment (UE), comprising detecting that the UE is simultaneously connected to a source base station (BS) of a source cell and a target BS of a target cell during a handover of the UE from the source cell to the target cell; detecting during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission; and transmitting one of the first or second uplink transmissions at the respective first or second transmission time, wherein a decision relating to transmitting which one of the first or second uplink transmissions is based on a priority associated with at least one of the first uplink transmission or the second uplink transmission.

Embodiment 2: The method of Embodiment 1, further comprising deciding to transmit the one of the first or second uplink transmissions at the respective first or second transmission time, based on the priority associated with at least one of the first uplink transmission or the second uplink transmission.

Embodiment 3: The method of any of Embodiments 1-2, wherein the priority associated with the at least one of the first uplink transmission or the second uplink transmission is based on a priority associated with at least one of the source cell or the target cell.

Embodiment 4: The method of any of Embodiments 1-3, wherein the priority associated with the at least one of the first uplink transmission or the second uplink transmission is based on a type of uplink channel scheduled to be transmitted in at least one of the first uplink transmission or the second uplink transmission.

Embodiment 5: The method of any of Embodiments 1-4, wherein the priority associated with the at least one of the first uplink transmission or the second uplink transmission is based on a time of transmission of at least one of the first uplink transmission or the second uplink transmission.

Embodiment 6: The method of any of Embodiments 1-5, wherein the priority is assigned to the at least one of the first uplink transmission or the second uplink transmission based on a random scheme.

Embodiment 7: The method of any of Embodiments 1-6, further comprising receiving the priority associated with the at least one of the first uplink transmission or the second uplink transmission.

Embodiment 8: The method of Embodiment 7, further comprising dropping transmission of the remaining one of the first or second uplink transmissions.

Embodiment 9: The method of Embodiment 1, wherein the transmitting comprises transmitting the one of the first or second uplink transmissions jointly coded with the remaining one of the first or second uplink transmissions, wherein the jointly coded transmission uses a first beam assigned to the first cell or the second cell associated with the one of the first or second uplink transmissions.

Embodiment 10: The method of Embodiment 9, further comprising transmitting at a next available slot, the one of the first or second uplink transmissions jointly coded with the remaining one of the first or second uplink transmissions using a second beam assigned to the remaining one of first cell or the second cell.

Embodiment 11: The method of Embodiment 10, further comprising transmitting the remaining one of the first or second uplink transmissions in a next available slot.

Embodiment 12: The method of any of Embodiments 1-11, further comprising receiving an indication of the decision for transmitting the one of the first or second uplink transmissions at the respective first or second transmission time, wherein each of the first or second uplink transmissions comprises at least one of a transmission on a physical uplink control channel (PUCCH) or a transmission on a physical uplink shared channel (PUSCH).

Embodiment 13: The method of any of Embodiments 1-12, wherein the handover is at least one of: a make-before-break (MBB) type of handover or a dual active protocol stack (DAPs) handover.

Embodiment 14: A method for wireless communication by a network entity, comprising detecting that a user equipment (UE) is simultaneously connected to a source base station (BS) of a source cell and a target BS of a target cell during a handover of the UE from the source cell to the target cell; detecting during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission; determining that the UE is to transmit one of the first or second uplink transmissions at the respective first or second transmission time, wherein a decision relating to the UE transmitting which one of the first or second uplink transmissions is based on a priority associated with at least one of the first uplink transmission or the second uplink transmission; and communicating with the UE based on the determination.

Embodiment 15: The method of Embodiment 14, further comprising deciding that the UE is to transmit the one of the first or second uplink transmissions at the respective first or second transmission time, based on the priority associated with at least one of the first uplink transmission or the second uplink transmission; and transmitting an indication of the decision to the UE.

Embodiment 16: The method of any of Embodiments 14-15, wherein the priority associated with the at least one of the first uplink transmission or the second uplink transmission is based on a priority associated with at least one of the source cell or the target cell.

Embodiment 17: The method of any of Embodiments 14-16, wherein the priority associated with the at least one of the first uplink transmission or the second uplink transmission is based on a type of uplink channel scheduled to be transmitted by the UE in at least one of the first uplink transmission or the second uplink transmission.

Embodiment 18: The method of any of Embodiments 14-17, wherein the priority associated with the at least one of the first uplink transmission or the second uplink transmission is based on a time of transmission by the UE of at least one of the first uplink transmission or the second uplink transmission.

Embodiment 19: The method of any of Embodiments 14-18, wherein the priority is assigned to the at least one of the first uplink transmission or the second uplink transmission based on a random scheme.

Embodiment 20: The method of Embodiment 14, further comprising transmitting the priority associated with the at least one of the first uplink transmission or the second uplink transmission.

Embodiment 21: The method of Embodiment 14, further comprising receiving the one of the first or second uplink transmissions jointly coded with the remaining one of the first or second uplink transmissions, wherein the jointly coded transmission is received using a first beam assigned to the first cell or the second cell associated with the one of the first or second uplink transmissions.

Embodiment 22: The method of Embodiment 21, further comprising receiving at a next available slot, the one of the first or second uplink transmissions jointly coded with the remaining one of the first or second uplink transmissions, wherein the jointly coded transmission is received using a second beam assigned to the remaining one of first cell or the second cell.

Embodiment 23: The method of Embodiment 22, further comprising receiving the remaining one of the first or second uplink transmissions in a next available slot.

Embodiment 24: The method of any of Embodiments 14-23, wherein the network entity comprises at least one of the source BS, the target BS, a core network entity controlling both the source BS and the target BS, a core network entity controlling at least one of the source BS or the target BS, or a combination thereof.

Embodiment 25: The method of any of Embodiments 14-24, wherein each of the first uplink transmission or the second uplink transmission comprises at least one of a transmission on a physical uplink control channel (PUCCH) or a transmission on a physical uplink shared channel (PUSCH).

Embodiment 26: The method of any of Embodiments 14-26, wherein the handover is at least one of: a make-before-break (MBB) type of handover or a dual active protocol stack (DAPs) handover.

Embodiment 27: An apparatus for wireless communication by a user equipment (UE), comprising a memory; and a processor coupled with the memory, the memory and the processor configured to detect that the UE is simultaneously connected to a source base station (BS) of a source cell and a target BS of a target cell during a handover of the UE from the source cell to the target cell; detect during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission; and transmit one of the first or second uplink transmissions at the respective first or second transmission time, wherein a decision relating to transmitting which one of the first or second uplink transmissions is based on a priority associated with at least one of the first uplink transmission or the second uplink transmission.

Embodiment 28: The apparatus of Embodiment 27, wherein the priority associated with the at least one of the first uplink transmission or the second uplink transmission is based on a priority associated with at least one of the source cell or the target cell.

Embodiment 29: An apparatus for wireless communication by a network entity, comprising a memory; and a processor coupled with the memory, the memory and the processor configured to detect that a user equipment (UE) is simultaneously connected to a source base station (BS) of a source cell and a target BS of a target cell during a handover of the UE from the source cell to the target cell; detect during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission; determine that the UE is to transmit one of the first or second uplink transmissions at the respective first or second transmission time, wherein a decision relating to the UE transmitting which one of the first or second uplink transmissions is based on a priority associated with at least one of the first uplink transmission or the second uplink transmission; and communicate with the UE based on the determination.

Embodiment 30: The apparatus of Embodiment 29, wherein the priority associated with the at least one of the first uplink transmission or the second uplink transmission is based on a priority associated with at least one of the source cell or the target cell.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method wireless communication by a user equipment (UE), comprising:
    detecting that the UE is simultaneously connected to a source base station (BS) of a source cell and a target BS of a target cell during a handover of the UE from the source cell to the target cell;
    detecting during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission;
    transmitting one of the first or second uplink transmissions at the respective first or second transmission time, wherein a decision relating to transmitting which one of the first or second uplink transmissions is based on a priority associated with at least one of the first uplink transmission or the second uplink transmission and wherein the transmitting comprises transmitting the one of the first or second uplink transmissions jointly coded with a remaining one of the first or second uplink transmissions using a first beam assigned to the source cell or the target cell; and
    transmitting at a next available slot, the one of the first or second uplink transmissions jointly coded with the remaining one of the first or second uplink transmissions using a second beam assigned to the remaining one of the source cell or the target cell.

2. The method of claim 1, wherein the priority associated with the at least one of the first uplink transmission or the second uplink transmission is based on a priority associated with at least one of the source cell or the target cell.

3. The method of claim 1, wherein the priority associated with the at least one of the first uplink transmission or the second uplink transmission is based on a type of uplink channel scheduled to be transmitted in at least one of the first uplink transmission or the second uplink transmission.

4. The method of claim 1, wherein the priority associated with the at least one of the first uplink transmission or the second uplink transmission is based on a time of transmission of at least one of the first uplink transmission or the second uplink transmission.

5. The method of claim 1, wherein the priority is assigned to the at least one of the first uplink transmission or the second uplink transmission based on a random scheme.

6. The method of claim 1, further comprising:
    receiving the priority associated with the at least one of the first uplink transmission or the second uplink transmission.

7. The method of claim 1, further comprising:
    receiving an indication of the decision for transmitting the one of the first or second uplink transmissions at the respective first or second transmission time, wherein each of the first or second uplink transmissions comprises at least one of a transmission on a physical uplink control channel (PUCCH) or a transmission on a physical uplink shared channel (PUSCH).

8. The method of claim 1, wherein the handover is at least one of: a make-before-break (MBB) type of handover or a dual active protocol stack (DAPs) handover.

9. An apparatus for wireless communication by a user equipment (UE), comprising:
    a memory; and
    a processor coupled with the memory, the memory and the processor configured to:
        detect that the UE is simultaneously connected to a source base station (BS) of a source cell and a target BS of a target cell during a handover of the UE from the source cell to the target cell;
        detect during the handover at least one of a first transmission time of a first uplink transmission scheduled for the source cell at least partially overlaps a second transmission time of a second uplink transmission scheduled for the target cell, or a time interval between the first and second transmission times is below a threshold, wherein the UE is capable of transmitting only one of the first uplink transmission or the second uplink transmission;
        transmit one of the first or second uplink transmissions jointly coded with a remaining one of the first or second uplink transmissions using a first beam assigned to the source cell or the target cell at a transmission time corresponding to the one of the first or second uplink transmissions, wherein the one of the first or second uplink transmissions is determined based on a priority associated with at least one of the first uplink transmission or the second uplink transmission; and
        transmit at a next available slot, the one of the first or second uplink transmissions jointly coded with the remaining one of the first or second uplink transmissions using a second beam assigned to the remaining one of the source cell or the target cell.

10. The apparatus of claim 9, wherein the priority associated with the at least one of the first uplink transmission or the second uplink transmission is based on a priority associated with at least one of the source cell or the target cell.

* * * * *